United States Patent
Harper

(10) Patent No.: US 7,967,108 B2
(45) Date of Patent: Jun. 28, 2011

(54) ACOUSTIC LINERS

(75) Inventor: Cedric B. Harper, Derby (GB)

(73) Assignee: Rolls-Royce, PLC, London (GB)

( * ) Notice: Subject to any disclaimer, the term of this patent is extended or adjusted under 35 U.S.C. 154(b) by 39 days.

(21) Appl. No.: 12/320,268

(22) Filed: Jan. 22, 2009

(65) Prior Publication Data

US 2009/0242321 A1  Oct. 1, 2009

(30) Foreign Application Priority Data

Mar. 28, 2008 (GB) .................................... 0805577.4

(51) Int. Cl.
 *E04B 1/82* (2006.01)
(52) U.S. Cl. ........ 181/292; 181/210; 181/214; 181/293; 181/294; 181/290; 415/119; 244/1 N
(58) Field of Classification Search .................. 181/292, 181/210, 214, 190, 293, 294, 288, 290; 244/1 N; 415/119
See application file for complete search history.

(56) References Cited

U.S. PATENT DOCUMENTS

| 4,161,231 | A * | 7/1979 | Wilkinson | 181/292 |
|---|---|---|---|---|
| 6,179,086 | B1 * | 1/2001 | Bansemir et al. | 181/292 |
| 6,182,787 | B1 * | 2/2001 | Kraft et al. | 181/292 |
| 6,256,959 | B1 * | 7/2001 | Palmersten | 52/588.1 |
| 6,530,453 | B1 * | 3/2003 | Miura et al. | 181/292 |
| 6,764,276 | B2 | 7/2004 | Mulcaire et al. | |
| 6,857,669 | B2 * | 2/2005 | Porte et al. | 285/368 |
| 7,334,393 | B2 * | 2/2008 | Porte | 60/226.1 |
| 2004/0045766 | A1 * | 3/2004 | Porte et al. | 181/210 |
| 2008/0086965 | A1 * | 4/2008 | Metz et al. | 52/309.9 |
| 2009/0078820 | A1 * | 3/2009 | Lin et al. | 244/1 N |
| 2009/0324390 | A1 * | 12/2009 | Harper et al. | 415/119 |

FOREIGN PATENT DOCUMENTS

| EP | 1 715 158 A2 | 10/2006 |
|---|---|---|
| EP | 1 715 172 A2 | 10/2006 |
| GB | 2 407 343 A | 4/2005 |

* cited by examiner

*Primary Examiner* — Forrest M Phillips
(74) *Attorney, Agent, or Firm* — Oliff & Berridge, PLC

(57) ABSTRACT

An acoustic assembly for a fan casing of a turbofan engine is made up from acoustic liner panel components which each comprise a body and a backing sheet. The body is an integral injection moulding that generally includes an acoustic structure, a perforated sheet and fastening portions. Adjacent panel components engage each other at non-linear circumferential edges which generally includes lugs on one of the components which are received in recesses of the other component. The lugs are defined by following cell walls over a convoluted path along the circumferential edge.

19 Claims, 3 Drawing Sheets

ACOUSTIC LINERS

This invention relates to an acoustic liner panel component for mounting on the interior of a fan case of a gas turbine engine.

In order to reduce noise emissions from gas turbine engines, it is known to provide acoustic assemblies on the inside of the engine, for example on the inside of a fan case of a turbofan engine.

U.S. Pat. No. 6,764,276 discloses an acoustic assembly assembled between guide vanes of a fan outlet guide vane assembly. However, it is also known for similar acoustic assemblies to be provided upstream and downstream of the fan itself, over regions of the fan case that are not occupied by the fan or any inlet or outlet guide vanes.

Known acoustic structures have a cellular form with cells extending in the thickness direction of the overall structure. Thus, when the structure is in place in a fan case, the cells extend radially of the fan case. In the context of the present invention, expressions such as "radially", "axially", and "circumferentially" relate to the rotational axis of the fan in the fan case. Also, references to a fan of a turbofan engine also embrace compressor stages of turbofan or other gas turbine engines, with references to "fan case" being interpreted accordingly.

The known acoustic assemblies are made up of separate panels which are individually secured to the inside surface of the fan case by fasteners which pass through the acoustic structure itself, for example through individual cells, or through openings provided at nodes in the walls between cells. This has the effect of securing the panels relatively rigidly to the fan case. This makes the acoustic panels stiffer, so diminishing their ability to attenuate noise.

In some cases, the panels of the acoustic assembly are themselves made up of smaller panel components which are formed separately and then secured together at circumferential edges.

According to the present invention there is provided an acoustic liner panel component for mounting on the interior of a fan case of a gas turbine engine, the panel component having an arcuate shape and comprising an acoustic structure provided on one face with a perforated sheet and on the opposite face with a backing sheet, a circumferential edge of the panel component having a non-linear configuration for interlocking engagement with a complementary circumferential edge of a circumferentially adjacent panel component in a panel component array.

The panel component may further comprise a fastening portion which extends outwardly of the acoustic structure for securing the panel component to the fan case. The provision of the fastening portion means that the panel component can be secured to the fan case without requiring fasteners that extend through the acoustic structure itself. Consequently, the sound attenuation achieved by the acoustic structure is not diminished by the presence of fastening means extending through the acoustic structure.

The fastening portion may be a rail provided at an axial edge of the panel component. The rail may be one of a pair of rails provided at the opposite axial edges of the panel component.

The fastening portion may constitute an ice impact panel, which may be substantially coplanar with the perforated sheet. The fastening portion may comprise at least one fastening formation, for example a hole for receiving a screw or a bolt, spaced from the acoustic structure The acoustic structure, the fastening portion and the perforated sheet may be formed integrally with one another in an injection moulding process. As a result, the manufacture of the panel component is simplified, and the parts count is reduced by comparison with panel components fabricated from a plurality of parts.

The acoustic structure may comprise an array of cells, and the non-linear configuration may follow walls of cells at the respective circumferential edge. The non-linear configuration may provide lugs for reception in recesses of the complimentary circumferential edge of the adjacent panel component, and each lug may be constituted by a single cell of the acoustic structure.

The present invention also provides a fan case provided with an acoustic liner comprising a circumferential array of acoustic liner panel components as defined above. At least some of the acoustic liner panel components may be secured to one another at adjacent circumferential edges, for example by adhesive bonding or welding. At least one bridging component may be provided which is secured to adjacent panel components to reinforce the joint between them.

For a better understanding of the present invention and to show more clearly how it may be carried into effect, reference will now be made, by way of example, to the accompanying drawings in which.

Figure 6:
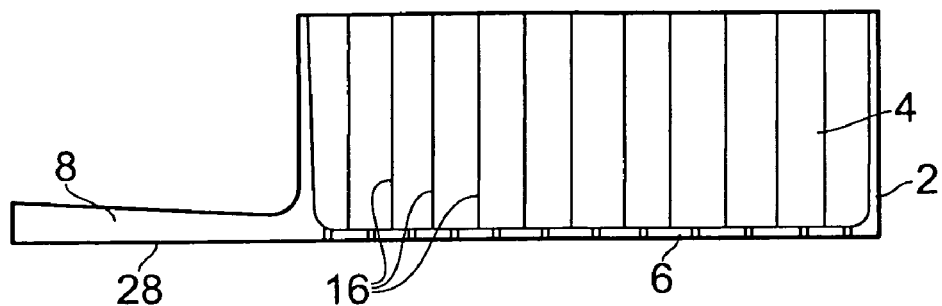
FIG. 6 is a view corresponding to FIG. 1 of an alternative form of panel component.
Figure 7:
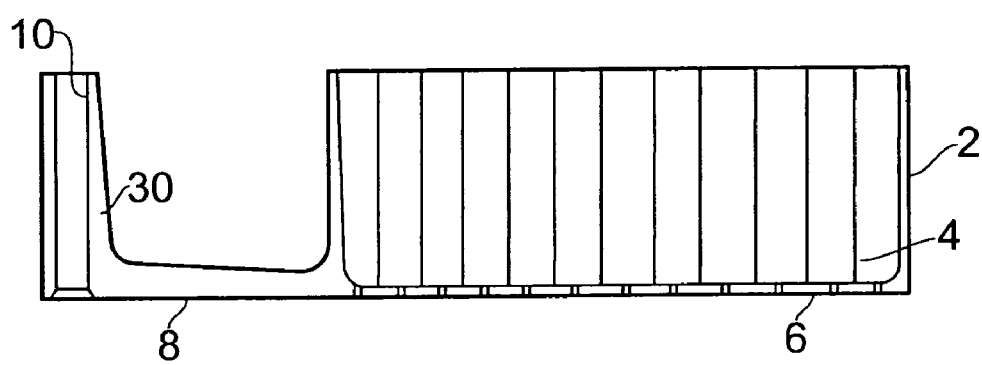
Figure 8:
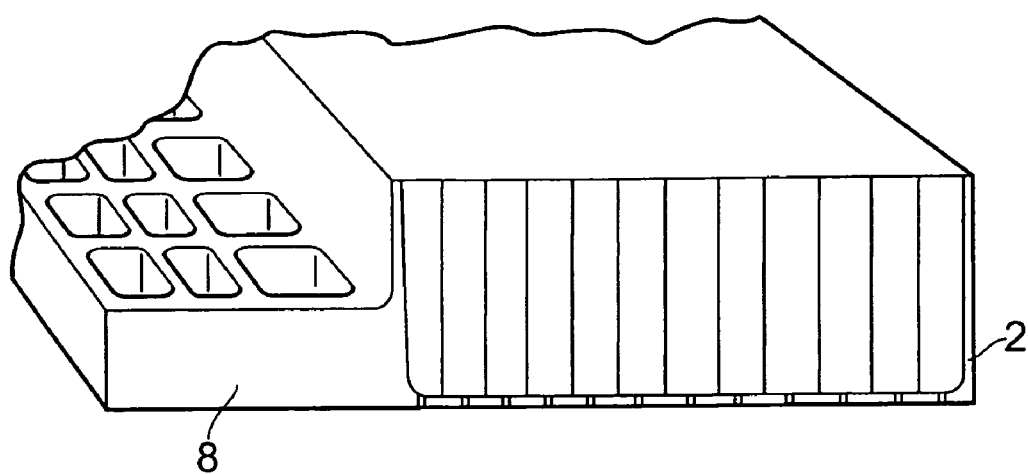

FIG. 7 corresponds to FIG. 6 but shows a modified form of the panel component; and FIG. 8 shows a further modified form of the panel component.

Figure 1:
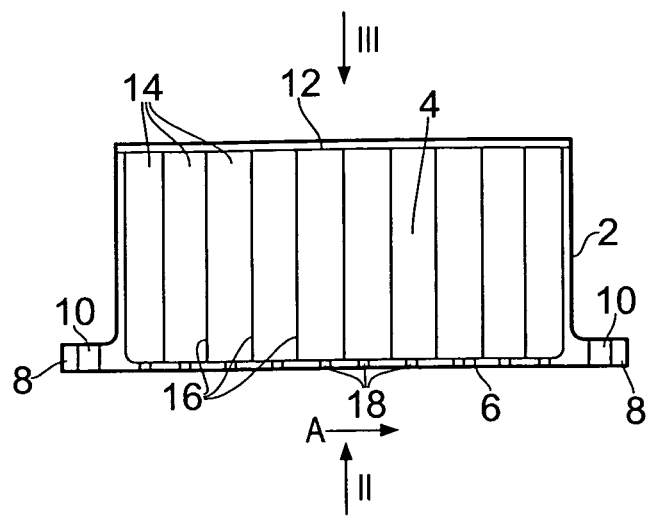
FIG. 1 is a sectional view of an acoustic liner panel component.
Figure 2:
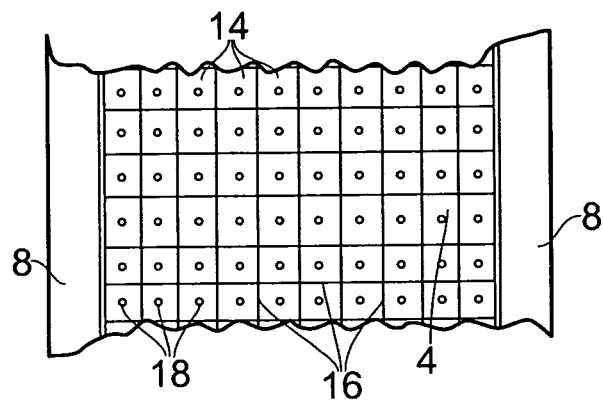
FIG. 2 is a view of a body of the panel component of FIG. 1 taken on the arrow II.
Figure 3:
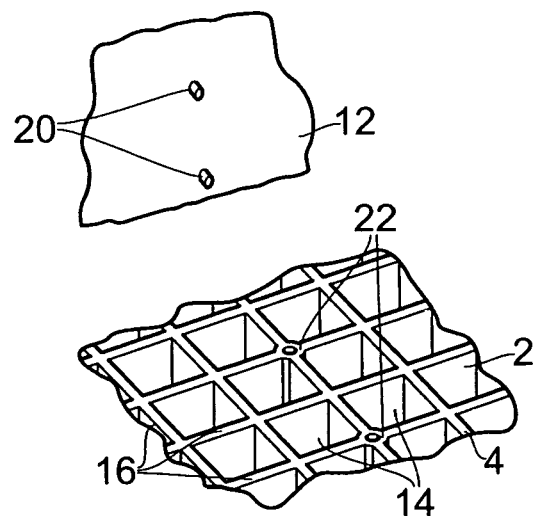
FIG. 3 is a fragmentary view on arrow III looking on backing sheet of the panel component of FIGS. 1 and 2.

The panel component shown in FIGS. 1 to 3 is intended to be a component of an annular acoustic liner assembly fitted to the inner surface of a fan case of a turbofan engine. Thus, although not apparent from FIGS. 1 and 2, the component has an arcuate shape, curved about an axis of the assembly which is situated below FIG. 1 and extends parallel to the gas flow direction indicated by an arrow A. The panel component comprises an integral body 2 formed by an injection moulding process from a suitable plastics material. The body 2 comprises an acoustic structure 4 and a perforated sheet 6 which extends over one face of the acoustic structure 4. At opposite axial edges, the body 2 has fastening portions 8 in the form of circumferentially extending rails. The rails 8 are provided with formations 10 which, in the embodiment shown in FIG. 1, are holes for receiving fastening elements such as bolts or screws in order to fasten the panel component to a fan casing.

A backing sheet or liner lid 12 is secured over the face of the acoustic structure 4 on the side away from the perforated sheet 6. The acoustic structure 4 comprises an array of cells 14 which extend in the radial direction ie across the thickness of the acoustic structure 4. As shown in FIG. 2, each cell has a square cross-section, the cells being separated from one another by intersecting walls 16. In FIG. 2 the backing sheet 12 is omitted, so that only the body 2 is visible.

The perforated sheet 6 is provided with perforations 18 which are centered on the axes of the respective cells 14 and provide communication between the gas flow A and the interiors of the cells 14. At their ends away from the perforated sheet 6, the cells 14 are closed by the backing sheet 12.

In FIG. 3, the backing sheet 12 is shown detached from the body 2. It is provided with a plurality of pins 20 or other projections which are engageable with openings 22 provided at nodes between intersecting walls 16 of the body 2. The backing sheet 12 can thus be press-fitted onto the acoustic structure 4. The backing sheet 12 may be secured to the body 2 by a frictional or interlocking fit between the pins 20 and the openings 22, but alternatively, or in addition, the pins 20 may be adhesively bonded or welded within the openings 22, or the backing sheet 12 may be bonded or welded to the cell walls 16.

Figure 4:
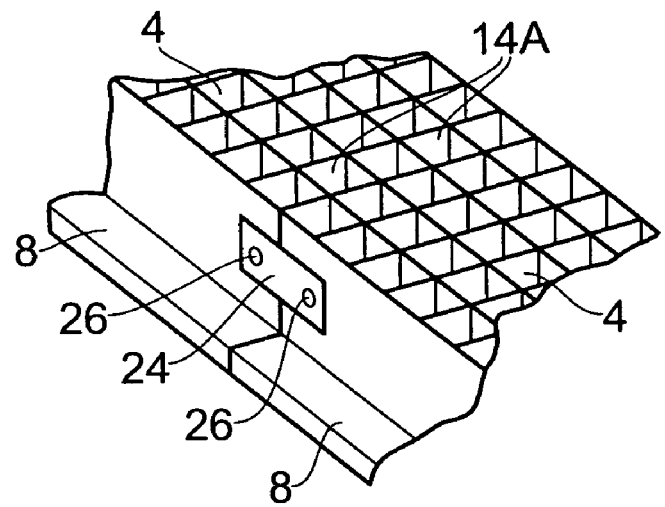
FIG. 4 is a fragmentary view of two panel components, as shown in FIGS. 1 to 3, which are joined together.
Figure 5:
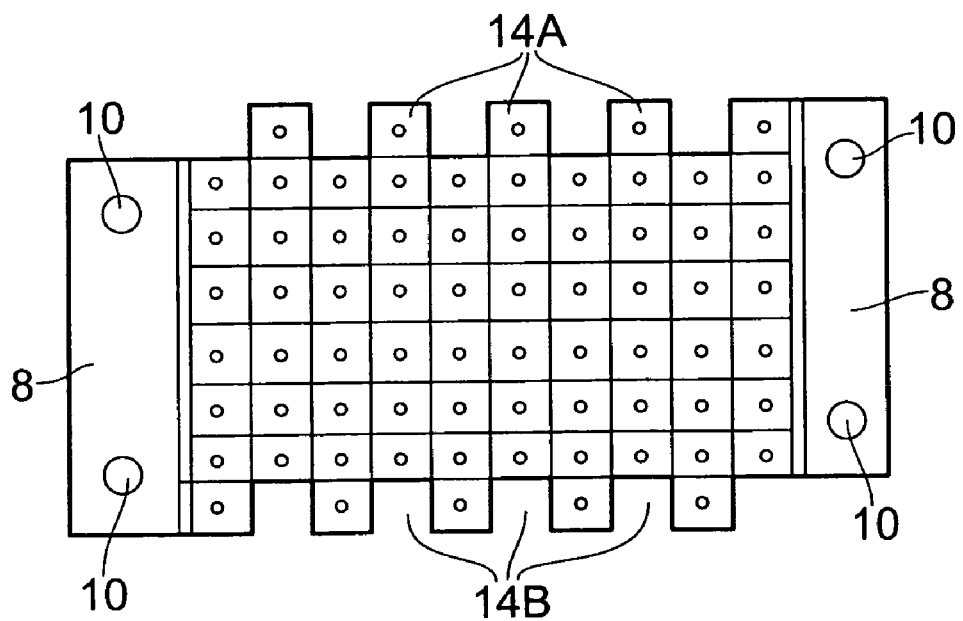
FIG. 5 is a side view of one of the panel components of FIG. 4.

FIGS. 4 and 5 illustrate engagement between adjacent panel components, as shown in FIGS. 1 to 3, to form a complete panel, or a complete array of panels, within the fan case. It will be appreciated from FIG. 5 that the circumferential edges of each panel component, as viewed in the radial direction indicated by the arrow 11 in FIG. 1, are non-linear. The configuration of each circumferential edge is achieved by following a convoluted path around the cells of the acoustic structure 4. Thus, as shown in FIG. 5, every second circumferential row of cells 14 has an extra cell 14A at the upper edge of the panel component (as seen in FIG. 5), and one fewer cell at the lower edge of the panel component, leaving recesses 14B. Consequently, two similar components can interlock with each other at adjacent edges, as shown in FIG. 4. Each additional cell 14A constitutes a lug, which engages in the corresponding recess 14B of the adjacent component.

This structure ensures that the adjacent panel components are located properly with respect to each other. In prior art assemblies, the joints between adjacent panel components are straight, which means that they are secured in their relative positions only by their fixings to the fan casing. Because the cooperating lugs 14A and recesses 14B locate the panel components, fewer fixtures to the fan casing are required and consequently the weight of the overall structure is reduced and assembly is simplified.

At least some pairs of adjacent panels may be bonded or welded together at their adjacent circumferential edges, in order to make the joint acoustically invisible, and to increase the rigidity of the overall assembly. Thus, the acoustic assembly may comprise a plurality of separate panels, each of which panels comprises a plurality of individual panel components joined together as shown in FIG. 4.

If necessary, a bridging piece 24 may be provided to reinforce the joint between the adjacent panel components. The bridging piece 24 is secured to each of the panel components across the join, for example by screws 26. Although the bridging piece 24 is shown on the exterior of the acoustic structure 4 of each panel component, it could be provided internally of the acoustic structure, or elsewhere at any suitable location.

FIG. 6 shows a modified form of the body 2. In this embodiment, the fastening portion 8 is extended so as to form an ice impact panel for protecting the fan case from impact by ice fragments cast from the fan blades as the fan rotates. As shown in FIG. 6, the ice impact panel 8 tapers in the direction towards the acoustic structure 4. This configuration provides added thickness where ice impact is likely to be greatest, or where the ice fragments are likely to be larger, while reducing the material requirements and weight where the additional strength is not required. For the same purpose, different regions of the acoustic structure 4 may have different properties. For example, the cell walls 16 may be thicker at locations nearer the fan, so that the acoustic structure 4 is better able to withstand ice impacts in this region. Also, the surface 28 of the ice impact panel 8 may be provided with an appropriate surface treatment to improve resistance to ice impact damage.

FIG. 7 shows a variant of the configuration shown in FIG. 6, in which the ice impact panel 8 is provided with a boss 30 in which the fastening hole 10 is provided. The boss 30 thus provides a spacer which engages the fan case, to allow securing of the panel component to the fan case without deflection of the ice impact panel 8. The boss 30 thus avoids the need to provide a separate spacer for this purpose and consequently reduces the part count of components required for the acoustic assembly.

FIG. 8 shows an embodiment in which the ice impact panel 8 has a waffle/isogrid configuration which increases the stiffness of the panel 8 and its ice impact resistance, while reducing the mount of material required. The waffle/isogrid configuration increases the overall acoustic area of the panel. The panel 8 thus has an array of holes 32 which may extend through all or part of the thickness of the panel 8, and may be configured to vary the ice impact resistance in the axial direction of the panel 8.

In use, the panel components are secured to the internal surface of the fan case either individually, or as complete panels made up of separate liner components secured together as described with reference to FIG. 4. The backing sheet 12 is disposed against the internal surface of the fan case. In some circumstances, it may be desirable for isolating elements, such as small rubber pads, to be interposed between the backing sheet 12 and the fan case in order to prevent frettage between the fan case and the panel component. Such pads could, for example, be bonded to the outer surface of the backing sheet 12.

Although the cells 14 are shown as being square in cross-section, any suitable shape can be used, for example hexagonal, triangular, circular or other regular structure. The shape of the cells will, of course, cause a corresponding change in the shapes of the lugs 14A and recesses 14B as shown in FIG. 5. The sizes of the cells may be varied over the extent of the acoustic structure 4, in order to tune the acoustic structure 4 to the frequency and location of the noise to be suppressed. Similarly, the depth of each cell can be adjusted to change the cell volume, to optimise absorption of noise of particular frequencies. In FIGS. 4 and 5, each lug 14A and corresponding recess 14B comprises a single cell. In alternative embodiments, each lug may embrace more than one cell 14.

The invention claimed is:

1. An acoustic liner panel component having an arcuate shape for mounting on the interior of a fan case of a gas turbine engine, comprising:
    an acoustic structure provided on a first face with a perforated sheet and on a second face with a backing sheet, the second face opposing the first face; and
    a circumferential edge having a non-linear configuration that interlocks with a complementary circumferential edge of a circumferentially adjacent panel component in a panel component array,
        wherein the non-linear configuration is in a step-like formation when viewed in a radial direction.

2. The acoustic liner panel component of claim 1, further comprising:
    a fastening portion that extends outwardly of the acoustic structure and that secures the panel component to a fan case,
        wherein the fastening portion comprising a circumferentially extending rail provided at an axial edge of the panel component.

3. The acoustic liner panel component of claim 2, further comprising an isolating element interposed between the backing sheet and the fan case.

4. The acoustic liner panel component of claim 2, wherein the fastening portion constituting an ice impact panel.

5. The acoustic liner panel component of claim 4, the ice impact panel tapering in the direction towards the acoustic structure.

6. The acoustic liner panel component of claim 4, wherein the ice impact panel being provided with a boss, the boss provides a spacer that secures the panel component to the fan case.

7. The acoustic liner panel component of claim 4, wherein the ice impact panel having a waffle or an isogrid configuration.

8. The acoustic liner panel component of claim 2, the fastening portion being substantially co-planar with the perforated sheet.

9. The acoustic liner panel component of claim 2, the fastening portion further comprising a fastening formation which is spaced from the acoustic structure.

10. The acoustic liner panel component of claim 2, wherein the acoustic structure, the perforated sheet and the fastening portion being formed integrally with each other in an injection moulding process.

11. The acoustic liner panel component of claim 1, the acoustic structure further comprising cells, the non-linear configuration following walls of the cells.

12. The acoustic liner panel component of claim 11, cell walls in selected locations being thicker than cell walls in the remainder of the acoustic structure.

13. The acoustic liner panel component of claim 11, wherein the cells are in a shape of at least one of square, hexagonal, triangular and circular structure.

14. The acoustic liner panel component of claim 1, wherein the non-linear configuration provides lugs for reception in recesses of the complementary circumferential edge of the adjacent panel component.

15. The acoustic liner panel component of claim 14, each lug being provided by a cell of the acoustic structure.

16. A fan case provided with an acoustic liner comprising a circumferential array of acoustic liner panel components including the acoustic liner panel component of claim 1.

17. The fan case of claim 16, at least some adjacent pairs of the panel components being secured to each other at adjacent circumferential edges.

18. The fan case of claim 17, the adjacent pairs of panel components being secured to each other by adhesive bonding or welding.

19. The fan case of claim 17, wherein at least one of the pairs of adjacent panel components being secured to each other are provided with a bridging component being secured to the adjacent panel components.

* * * * *